United States Patent [19]

Yamaguchi

[11] Patent Number: 4,852,102
[45] Date of Patent: Jul. 25, 1989

[54] INTERLEAVE SEQUENCE METHOD

[75] Inventor: Susumu Yamaguchi, Moriguchi, Japan

[73] Assignee: Matsushita Electric Industrial Co., Ltd., Kadoma, Japan

[21] Appl. No.: 187,315

[22] Filed: Apr. 28, 1988

[30] Foreign Application Priority Data

May 1, 1987 [JP] Japan .................. 62-106373

[51] Int. Cl.$^4$ .................. G06F 11/10
[52] U.S. Cl. .................. 371/40; 371/38
[58] Field of Search .................. 371/37, 38, 39, 40, 371/41, 42, 44

[56] References Cited

U.S. PATENT DOCUMENTS

| | | | |
|---|---|---|---|
| 4,559,625 | 12/1985 | Berlekamp | 371/40 |
| 4,598,403 | 7/1986 | Odaka | 371/40 |
| 4,622,598 | 11/1986 | Doi | 371/40 |
| 4,680,764 | 7/1987 | Suzuki | 371/40 |
| 4,744,086 | 5/1988 | Kamly | 371/40 |

OTHER PUBLICATIONS

Nakajima and Ogawa, "Reading Book on Compact Disk", Ohm Publishing Co., Nov. 25, 1982.
"Digital Audio Taperecorder System (R-DAT) recommended design standard-2nd-Draft-", DAT Conference, Apr. 16, 1986.
"Digital Audio Recording in M-II Format VTR", SMPTE 20th Television Conference No. 24. pp. 187 to 200, Feb. 1986; S. Tujii et al.

Primary Examiner—Michael R. Fleming
Attorney, Agent, or Firm—Spencer & Frank

[57] ABSTRACT

An interleave sequence method is provided which is used in processing signals during recording and reproducing a digital audio signal to be multiple recorded with a video signal by a rotary head type VTR. After the digital audio signal is synchronized with the video signal, an optimum helical type interleave is performed to generate a recording signal having high error correction ability and short process delay time.

10 Claims, 12 Drawing Sheets

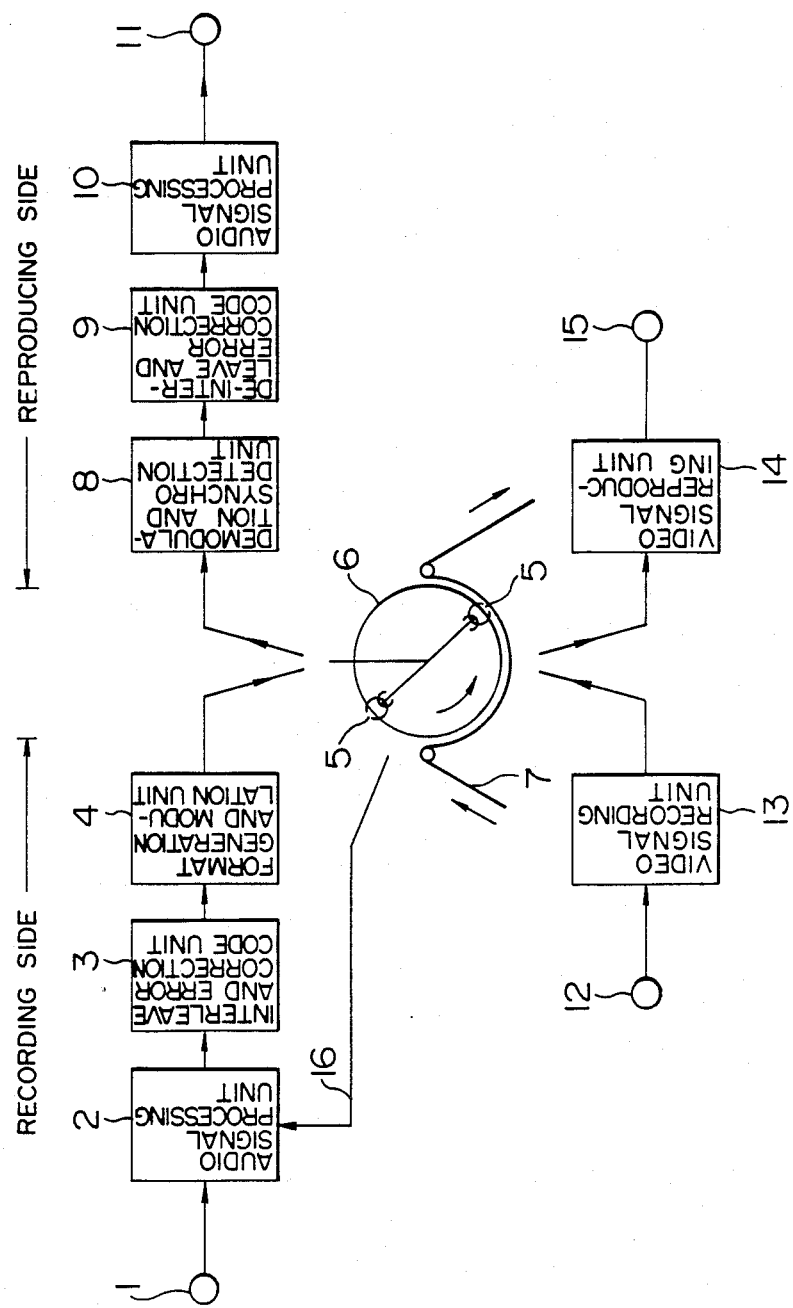

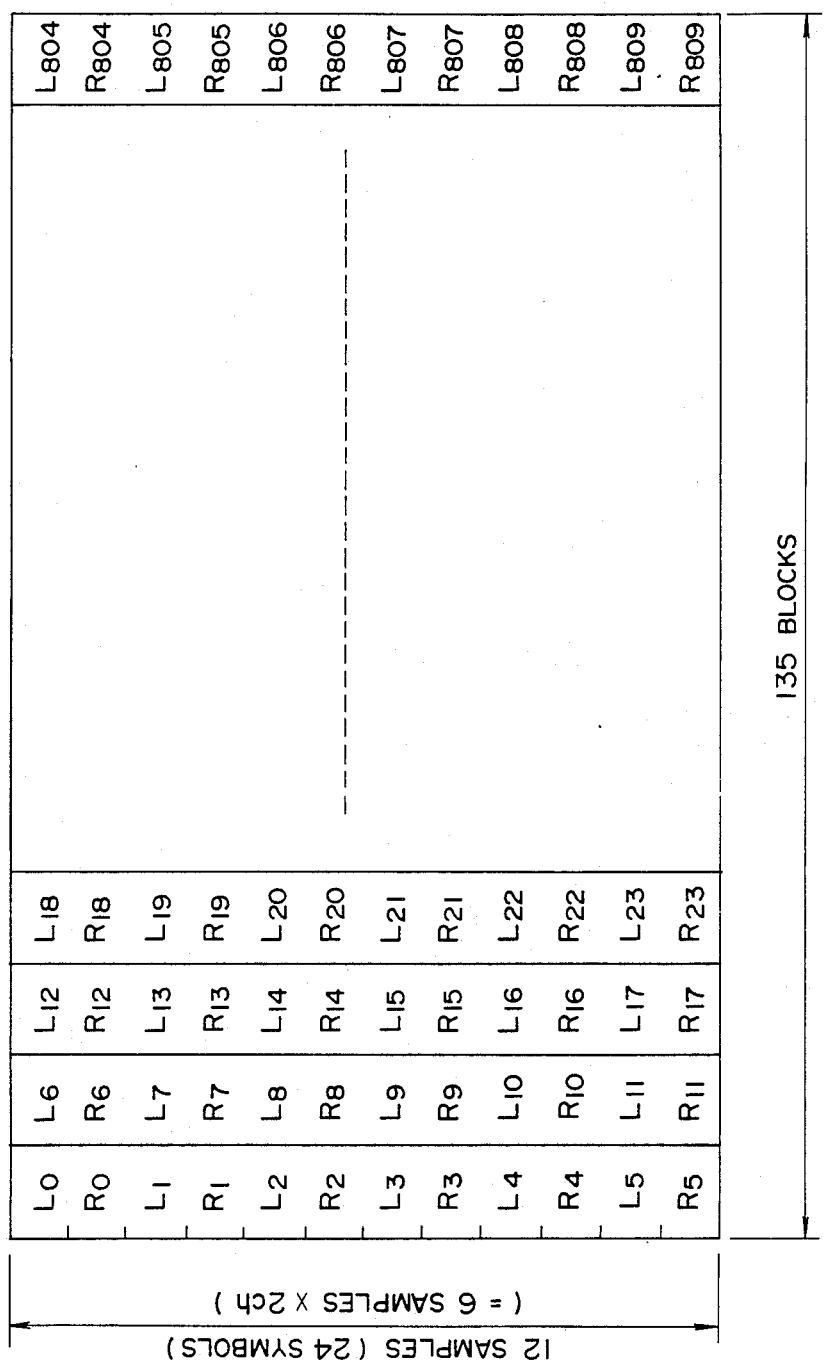

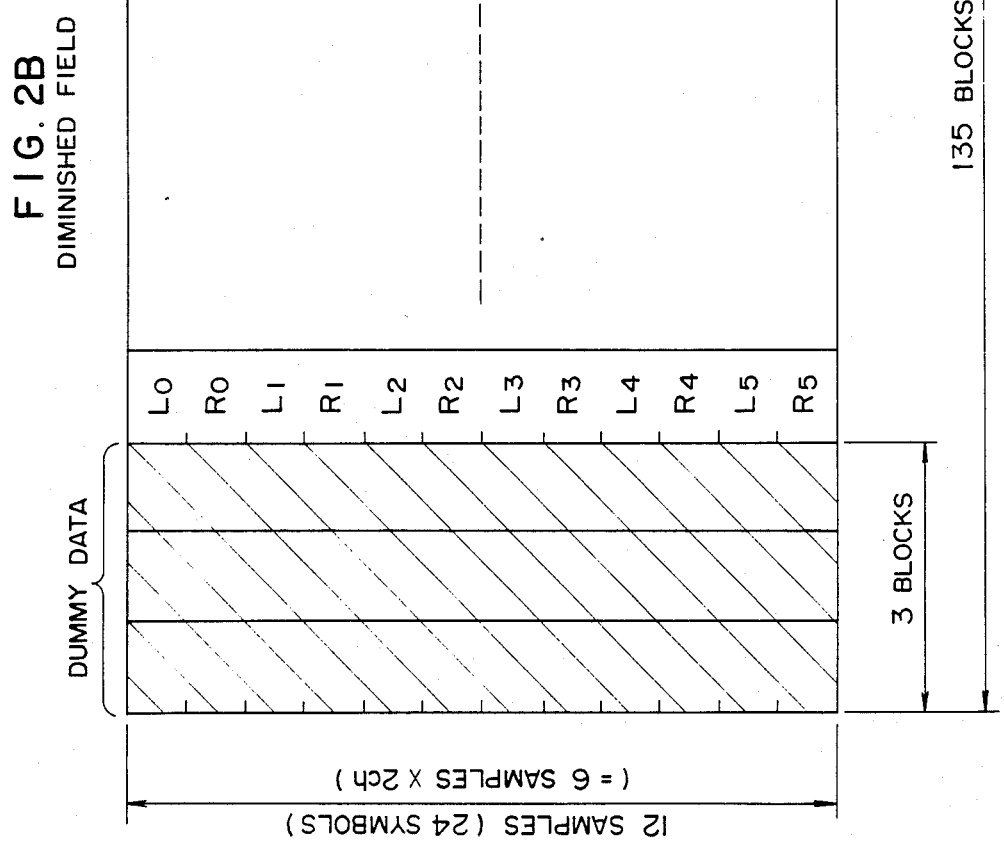

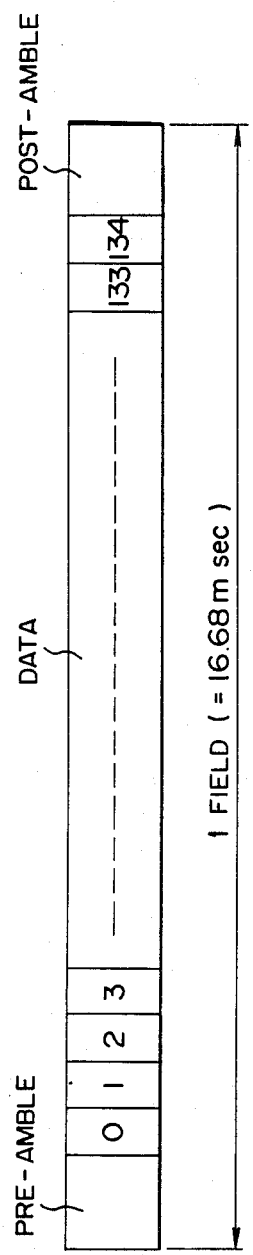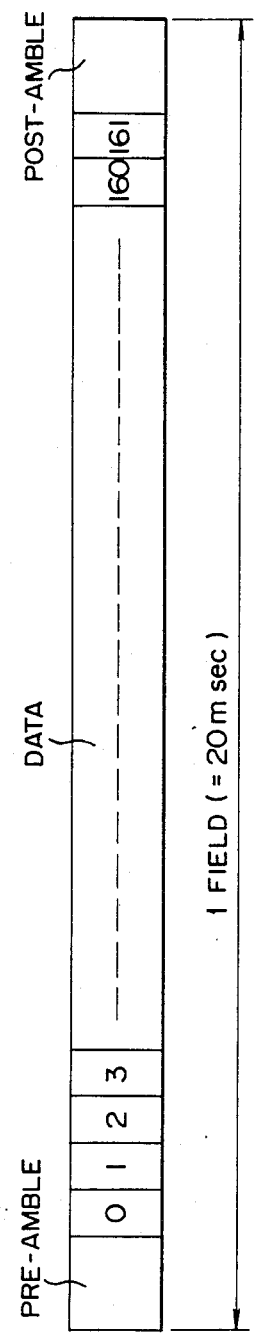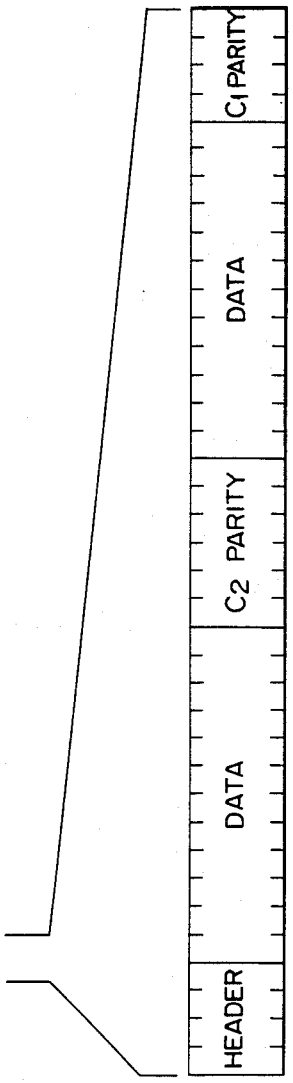
FIG. 3A1 525 LINE-60 FIELD SYSTEM
FIG. 3A2 625 LINE-50 FIELD SYSTEM
FIG. 3B BLOCK FORMAT ( ): 625 LINE-50 FIELD SYSTEM ( ): 625 LINE-50 FIELD SYSTEM

INTERLEAVE SEQUENCE METHOD

BACKGROUND OF THE INVENTION

1. FIELD OF THE INVENTION

The present invention relates to a digital audio signal interleave sequence method for recording and reproducing digital audio signals on and from a video tape simultaneously with video signals using rotary heads.

2. DESCRIPTION OF THE RELATED ART

Digital audio recording or so-called pulse code modulation (PCM) recording of audio signals in the form of digitalized signals has made remarkable progress nowadays. Typical examples are compact disks (hereinafter abbreviated as CD) and rotary head type digital audio tape recorders (hereinafter abbreviated as R-DAT), which are described, for example, in (1) Nakajima and Ogawa, "Reading Book on Compact Disk", Ohm Publishing Company, Nov. 25, 1982 and (2) "Digital Audio Taperecorder System (R-DAT) recommended design standard 2nd Draft-", DAT Conference, Apr. 16, 1986.

As a means for obtaining a high quality of sounds in a video taperecorder (hereinafter abbreviated as VTR), a frequency modulation (FM) method has been adopted heretofore to realize high fidelity VTRs now popularized in the world. To further improve the sound quality, it is reasonable to consider that the PCM recording or digital audio recording method will take the place of the FM recording method.

During recording and reproducing digital audio signals on and from a medium such as a magnetic tape, a drop-out in reproduced data, i.e., a missing data phenomenon due to defects on the medium or some other reasons may occur. To avoid the drop-out, error correction codes or so-called redundancy data are added to original digital audio data to be recorded. Since a drop-out due to burst errors is quite above the capacity of error correction codes alone, a data dispersion method called an interleave has been adopted wherein burst errors are converted into random errors.

Interleave methods for converting burst errors into random errors are mainly divided into two types: a helical type interleave which adopts simple delays as used in CDs, and a block completed type interleave as used in R-DATs.

Because of separation of digitalized sounds by rotary heads of a VTR during recording and reproducing, it is generally preferable to adopt the block completed type interleave method which allows synchronization with the revolution period of the rotary heads. Thus, VTRs for business use now adopt the block completed type interleave method wherein independent tracks are provided for video and sound signals, and the sound signals are subjected to time compression for recording and reproducing (e.g., refer to S. Tujii et. al.; "Digital Audio Recording in M-II Format VTR" SMPTE 20th Television Conference No. 24, pp. 187 to 200, February 1986). However, for custom use VTRs which must essentially satisfy upper compatibility with current types in adding new functions, it is difficult to provide a new track dedicated to digital sounds. Therefore, a multiple recording method which records both sound and video signals at a time as in the FM recording method must be used. In such a case, if the block completed type interleave method is used with the completed period being that of a video field or frame, the total process time required becomes at least two times the completed period or more because the interleaving becomes complete at both the recording and reproducing sides, which results in a considerable time delay between analog video signals and digital sound signals. Such time delay will increase as editing or dubbing is repeated. On the other hand, although the helical type interleave method is complicated in processing signals due to its non-completed nature, it can process signals within a time corresponding to a so-called "interleave depth". Thus, assuming the same error correction ability as the block completed type interleave, the helical type interleave method can advantageously process signals within half the time required by the former, or less. The helical type interleave method has been applied to CDs for example. Contrary to the application to discs, the helical type interleave method has been found not always satisfactory in signal processing and error correction ability if it is applied to rotary head type VTRs for recording digital sound signals.

SUMMARY OF THE INVENTION

It is an object of the present invention to provide an interleave sequence method capable of providing high error correction capability and less delay time to digital audio signals which are to be recorded with video signals by a VTR through multiple processing.

To achieve the above object, the interleave sequence method of this invention comprises the steps of:

dividing an inputted digital audio signal into process units having an even number of samples per channel, separating one sample into an upper symbol and a lower symbol, synchronizing the divided digital audio signal with a video signal by inserting dummy data in the divided digital audio signal at a video field period, and classifying the synchronized digital audio signal into an odd series and an even series in the time sequential order of sampling (scrambling process);

giving a predetermined delay between the classified odd and even series (an offset delay process);

delaying both the predetermined time delayed series such that a different delay time is given to each sample data (main interleave process);

generating a first error correction code C2 at the stage before or after the main interleave process, based o both the predetermined time delayed series (a C2 encode process);

subjecting the generated first error correction code C2 to the same main interleave process, and delaying the data subjected to the main interleave process such that only ones of the upper symbols and the lower symbols divided from each sample data are delayed by a unit time (a C1 interleave process);

generating a second error correction code C1 based on the data subjected to the C1 interleave process (a C1 encode process); and delaying only the others, opposite to those ones at the C1 interleave process, of the upper and lower symbols of the data and the second error correction code C1 by the same unit time (a C1 de-interleave process); and whereby a one-block recording signal is formed by adding a synchro signal called a header and other necessary data to the data obtained by the above processes, a predetermined number of blocks per video field are subjected to a predetermined digital modulation to thereafter perform multiple-recording with a video signal; and whereby original digital audio data are reproduced by performing the above processes in a reverse order.

In the interleave method of this invention constructed as above, a digital audio signal is synchronized with a video signal at each video field period, the upper and lower symbols of respective sample data are disposed on a video tape in conjugate relation to each other, the first or second error correction code series are made the same with respect to the upper and lower symbols of each sample data, and the superposition of the first and second error correction code series to the upper and lower symbols of each sample data is avoided, to thereby enable high error correction ability and short process delay time.

BRIEF DESCRIPTION OF THE DRAWINGS

FIG. 1 is a block diagram showing the structure of a VTR having a digital audio signal recording function embodying the interleave method according to the present invention;

FIGS. 2A and 2B show examples of output data from the audio signal processing unit shown in FIG. 1 after synchronized with a video signal;

FIGS. 3A, 3B and 3C show the field and block structure of recording data at the format generation and modulation unit shown in FIG. 1;

DESCRIPTION OF THE PREFERRED EMBODIMENTS

Figure 4A:
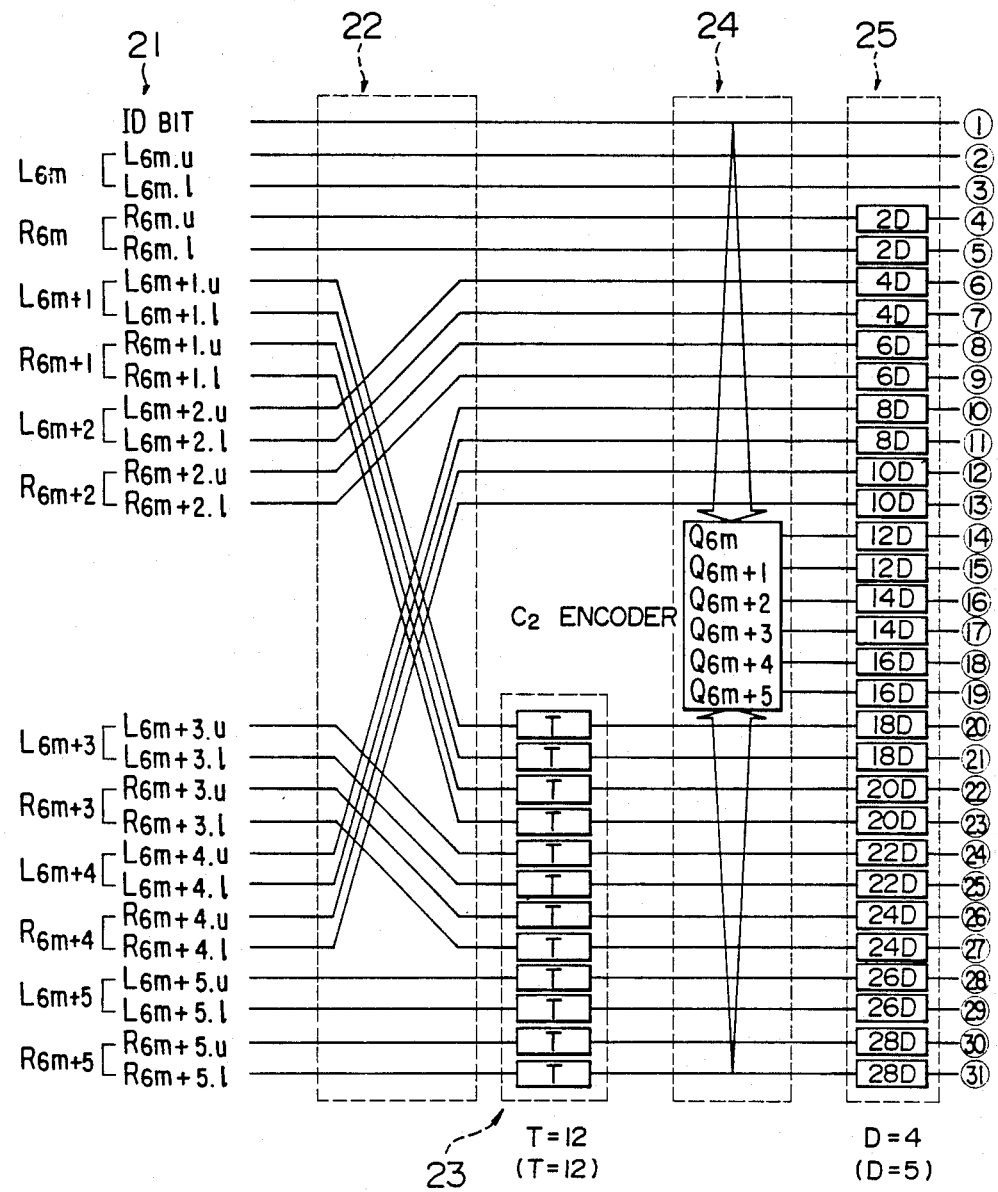
FIGS. 4A and 4B show a preferred embodiment of the interleave and ECC unit shown in FIG. 1.

The structure of a VTR having a digital audio recording function embodying the interleave method according to the present invention is shown in FIG. 1.

Referring to FIG. 1, reference numeral 1 represents an input terminal for a digital audio signal, 2 an audio signal processing unit, 3 an interleave and error correction code (hereinafter abbreviated as ECC) unit, 4 a format generation and modulation unit, 5 a rotary head, 6 a rotary cylinder, 7 a video tape, 8 a demodulation and synchro detection unit, 9 a de-interleave and ECC unit, 10 an audio signal processing unit, and 11 an output terminal for a digital audio signal. Reference numeral 12 represents a video signal input terminal, 13 a video signal recording unit, 14 a video signal reproducing unit, and 15 a video signal output terminal, all of which are similar in construction and operation to those conventional.

Processing digital audio signals of a VTR embodying the interleave method of this invention and constructed as above will now be described.

A signal to be inputted to the digital audio signal input terminal 1 is an audio signal already digitalized by an A/D converter. A stereo signal with right (R) and left (L) two channels at a sample frequency 48 kHz and 16 bit linear quantization is considered in this embodiment by way of example. A digital audio signal inputted to the audio signal processing unit 2 is divided into process units composed of time sequentially consecutive 6 sample data per channel, similar to those in CDs except that the signal is separately recorded by rotary heads so that the signal is necessary to be subjected to a synchronization process with a video signal. An average number of samples of a digital audio signal per field in a 525 line - 60 field system or so-called NTSC system is 48000 (sample/sec)/59.94 Hz = 800.8 (sample/field). Since the revolution frequency of the cylinder is essentially involves an error such as jitter, two fields are prepared in this embodiment having a data capacity of integer multiples of 6, one field smaller that the average sample number and the other larger. The digital audio signal thus can be synchronized with the video signal by selectively recording both types of fields while monitoring the revolution period of the rotary cylinder. The field having a capacity larger than the average sample number is called, for example, an excess filed which has 810 samples per a channel (=6 samples ×135 blocks). The other field having a capacity smaller than the average sample number is called, for example, a diminished field which has 792 samples per a channel (=6 samples ×132 blocks). Dummy data are filled in the portion corresponding to the difference between the capacities so that the number of blocks per field is the same for both the fields, which is illustrated in FIGS. 2A and 2B. The optimum field structure for different recording conditions, such as field frequency, sample frequency, channel number or the like may be determined readily in accordance with the same design criterion. As a signal for discriminating whether a field is an excess field or a diminished field, an ID bit is recorded in a header to be described later by performing an interleave process in a similar manner as of digital audio data.

A digital audio signal is divided into process units composed of 6 samples per a channel by the audio signal processing unit 1 shown in FIG. 1, filled in with dummy data synchronized with a video signal at each field, and inputted to the interleave and ECC unit 3 shown in FIG. 1.

Figure 4B:
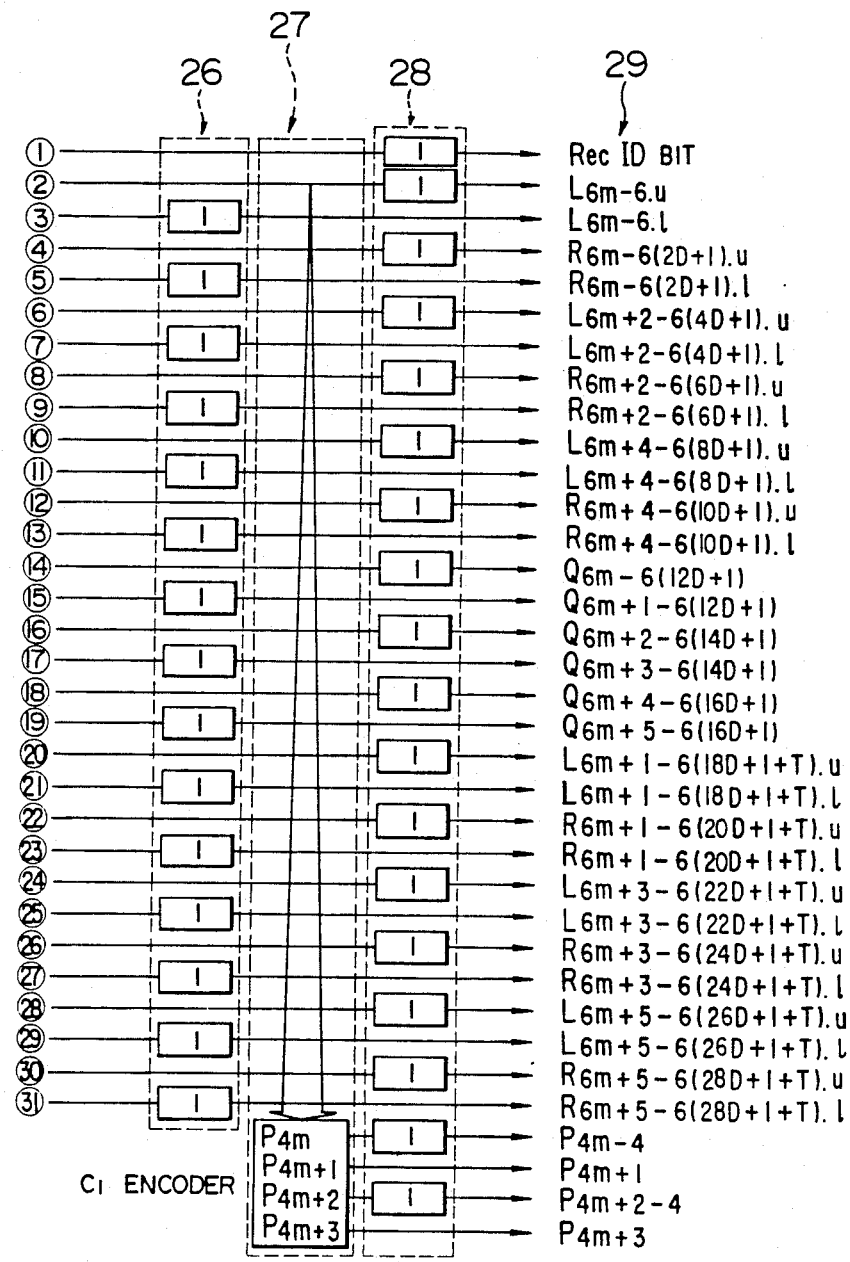

The detailed construction of the interleave and ECC unit is shown in FIGS. 4A and 4B.

Referring to FIGS. 4A and 4B, reference numeral 21 represents an input terminal for digital audio data, 22 a scramble processing unit, 23 an offset delay processing unit, 24 a C2 encode processing unit, 25 a main interleave processing unit, 26 a C1 interleave processing unit, 27 a C1 encode processing unit, 28 a C1 de-interleave processing unit and 29 an output terminal for digital audio data.

Digital audio data applied to the input terminal 21 are divided into one-block process units each composed of 6 samples for L channel and 6 samples for R channel. Each process unit is then separated into even and odd series in the time sequential order b the scramble processing unit 22. A predetermined delay is given between both the series by the offset delay processing unit 23 to thereby improve an interpolation function during the reproducing. Thereafter, a first error correction code C2 is generated at the C2 encode processing unit 24, based on the data of both the series subjected to the scramble process and the offset delay process. The data subjected to the scramble process and offset delay process and the first error correction code C2 ar delayed by the main interleave processing unit 25 such that a different linear delay is given to each sample data. Next, the lower symbols of respective sample data are delayed by a unit (one block) time by the C1 interleave processing unit 26 whereby a second error correction code C1 is generated by the C1 encode processing unit 27 and added to the data delayed by the unit time by the C1 interleave processing unit 26. The upper symbols, opposite to those processed by the C1 interleave processing unit 26, of the obtained sample data are delayed by the same unit time by the C1 de-interleave processing unit 28, the resultant data being outputted from the digital audio data output terminal 29. The data added with the first and second error correction codes and subjected to the interleave processes are then inputted, as the data constituting one-block record format, to the format generation and modulation unit 4 shown in FIG. 1. As seen form FIGS. 3A, 3B and 3C, one-block data are added with a header including a synchronous signal, the ID bit and other necessary information. In a 525 - 60 field system, i.e., NTSC system VTR and a 625 line - 50 PAL or SECAM system VTR, one-field data are constructed of 135 blocks and 162 blocks, respectively, with a pre-amble and a post-amble added to the start and end of the field for keeping off unstable durations before and after switching rotary heads. After subjecting to a predetermined modulation, the digital audio signal thus processed is then multiple-recorded with a video signal on a video tape.

Figure 5A:
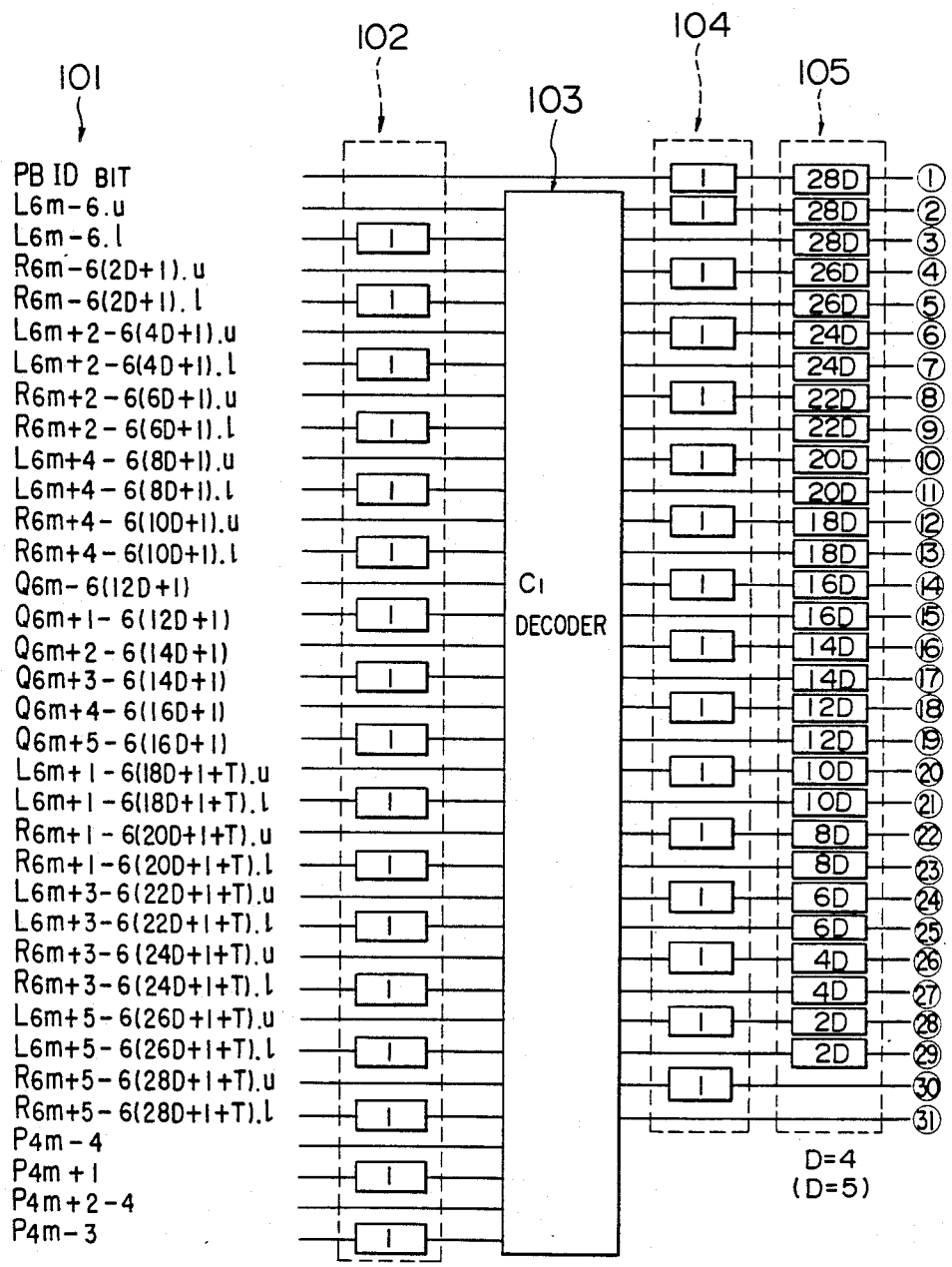
FIGS. 5A and 5B show a preferred embodiment for performing the processes shown in FIGS. 4A and 4B in the reverse order at the de-interleave and ECC unit shown in FIG. 1.
Figure 5B:
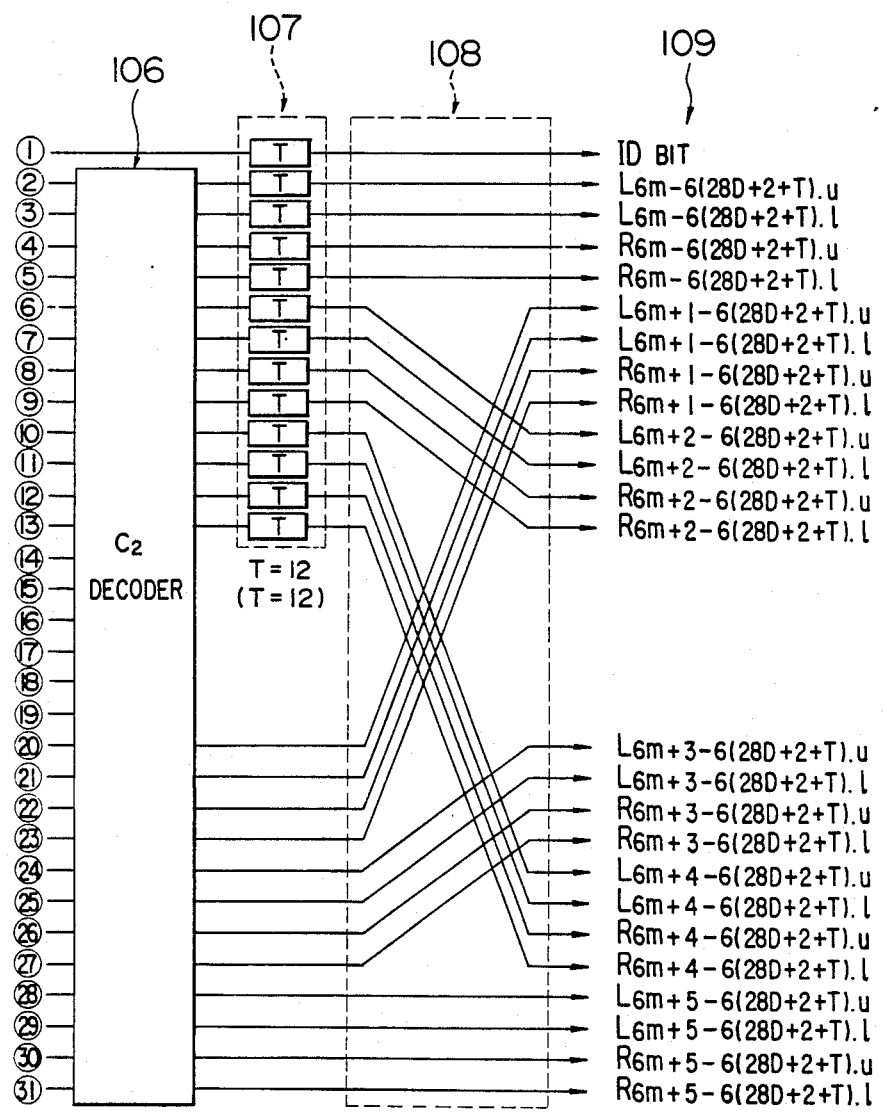

The above processes are performed in the reverse order in regenerating digital audio signals. Referring to FIG. 1, signals picked up by the rotary heads 5 are inputted to the demodulation and synchro detection unit 8 whereat the signals undergo a predetermined demodulation and thereafter synchronous signals are detected to re-adjust the data arrangement order. Then, the signals are subjected to error detection and correction by the de-interleave processing and ECC unit 9 and to dummy data removal by the audio signal processing unit 10, to thereby output the original digital audio data from th digital audio data output terminal 11. The detailed structure of the de-interleave and ECC unit 9 is shown in FIGS. 5A and 5B.

As appreciated from the interleave method of this embodiment, the delay amount is the same for both the upper and lower symbols of each sample data at the main interleave processing unit 25 shown in FIG. 4, and the C1 interleave processing unit 26 and the C1 de-interleave processing unit 28 are provided after and before the C1 encode processing unit 27. Therefore, the first error correction code C2 can be made the same with respect to the upper and lower symbols of each sample data, the upper and lower symbols can be recorded on a magnetic tape in conjugate relation to each other, and the first and second error correction codes can be arranged without any superposition. It becomes accordingly possible to realize a digital audio recording and reproducing apparatus having high error detection and correction ability while retaining the advantage of the helical type interleave, i.e., short delay in processing.

The first and second error correction codes used in the above embodiment are not specifically identified, but they may be a Reed-Solomon code or any other code. As the code length, 6 symbols and 4 symbols have been used for the first and second error correction codes C2 and C1, respectively. However, the code length may be determined optionally in accordance with the desired error correction ability.

Further, although the delay amount set by the offset delay processing unit 23, main interleave processing unit 25, C1 interleave processing unit and C1 de-interleave processing unit 28 has been determined such that the total delay time in processing becomes about one field in each television system, the delay amount may be determined optionally in accordance with the desired error correction ability.

Figure 6A:
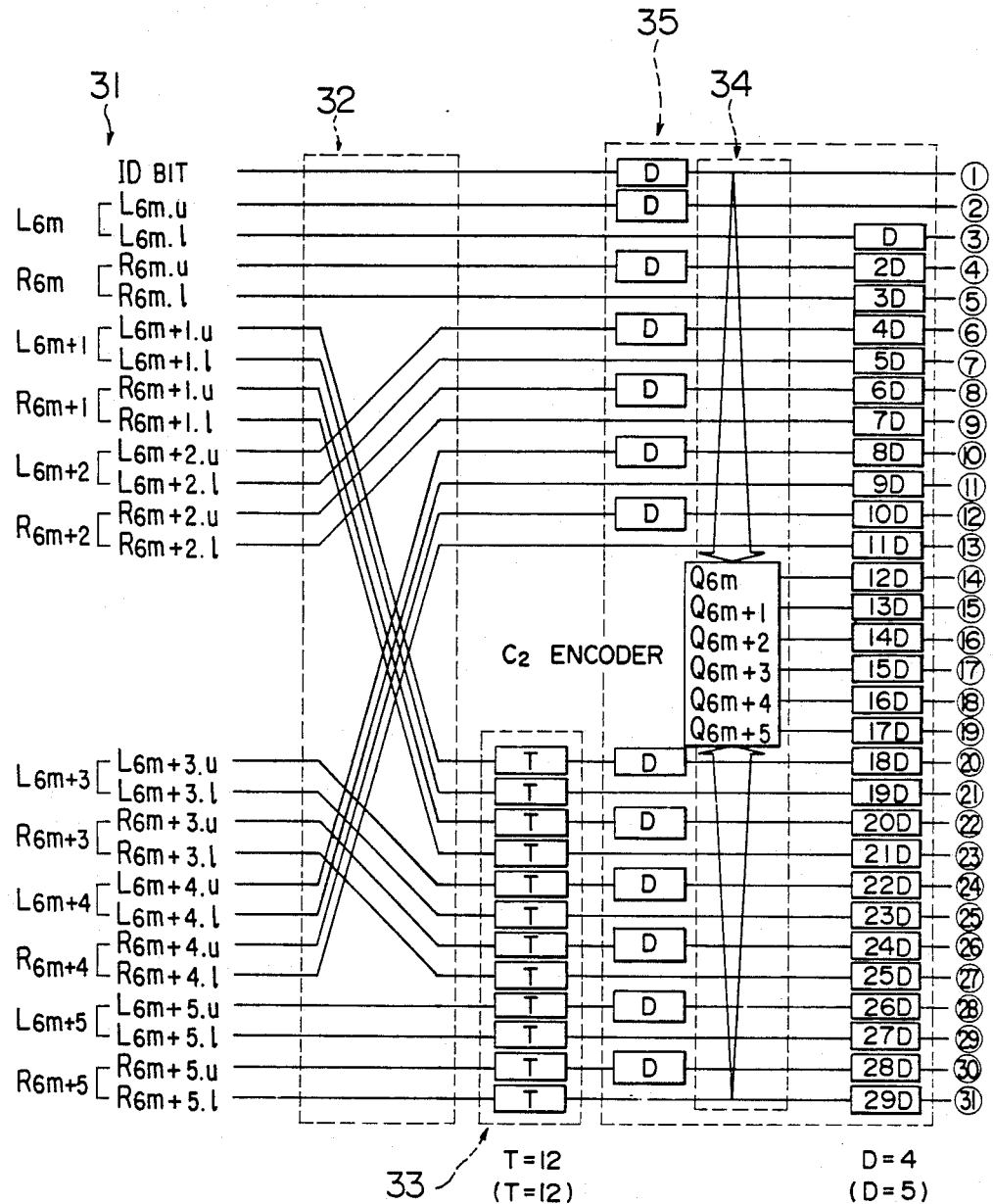
FIGS. 6A and 6B show a modification of the interleave and ECC unit shown in FIG. 1.
Figure 6B:
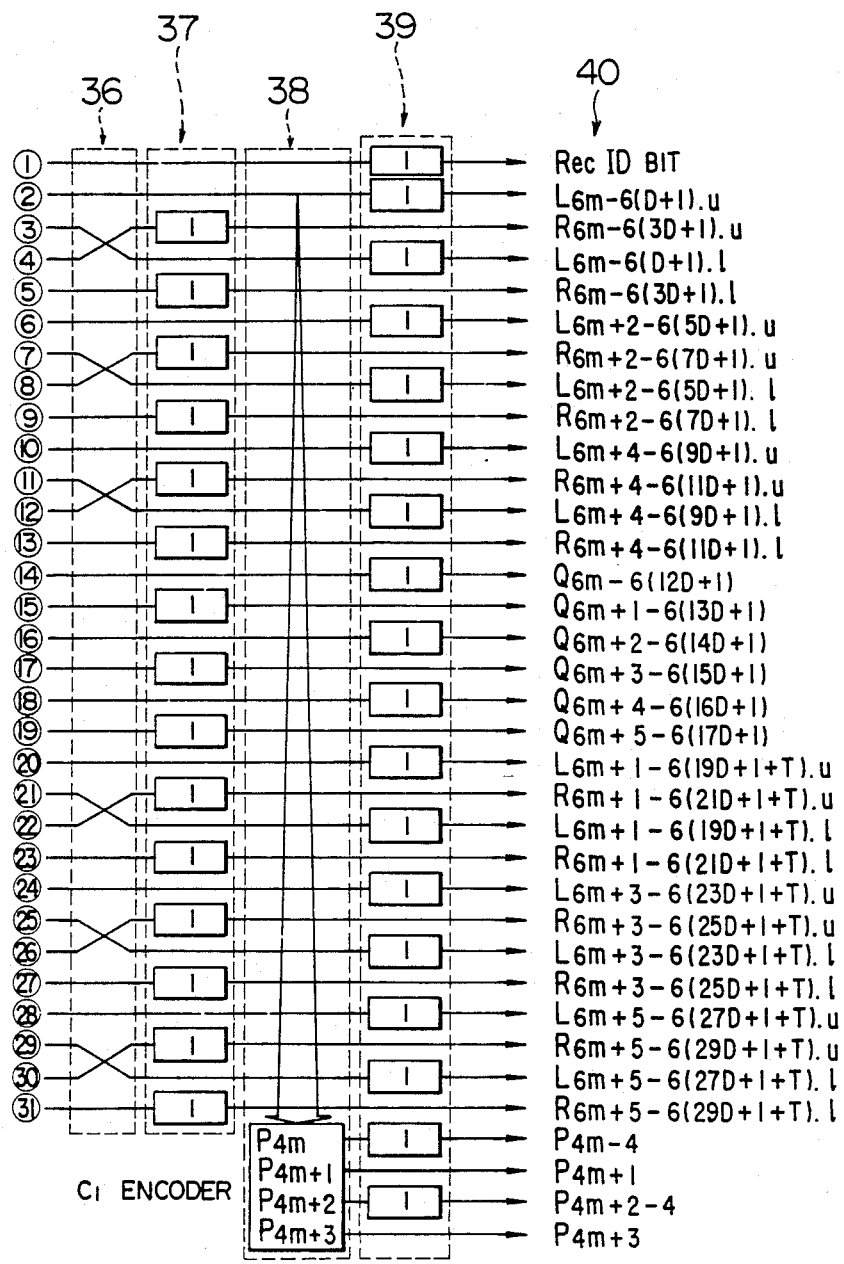
Figure 7A:
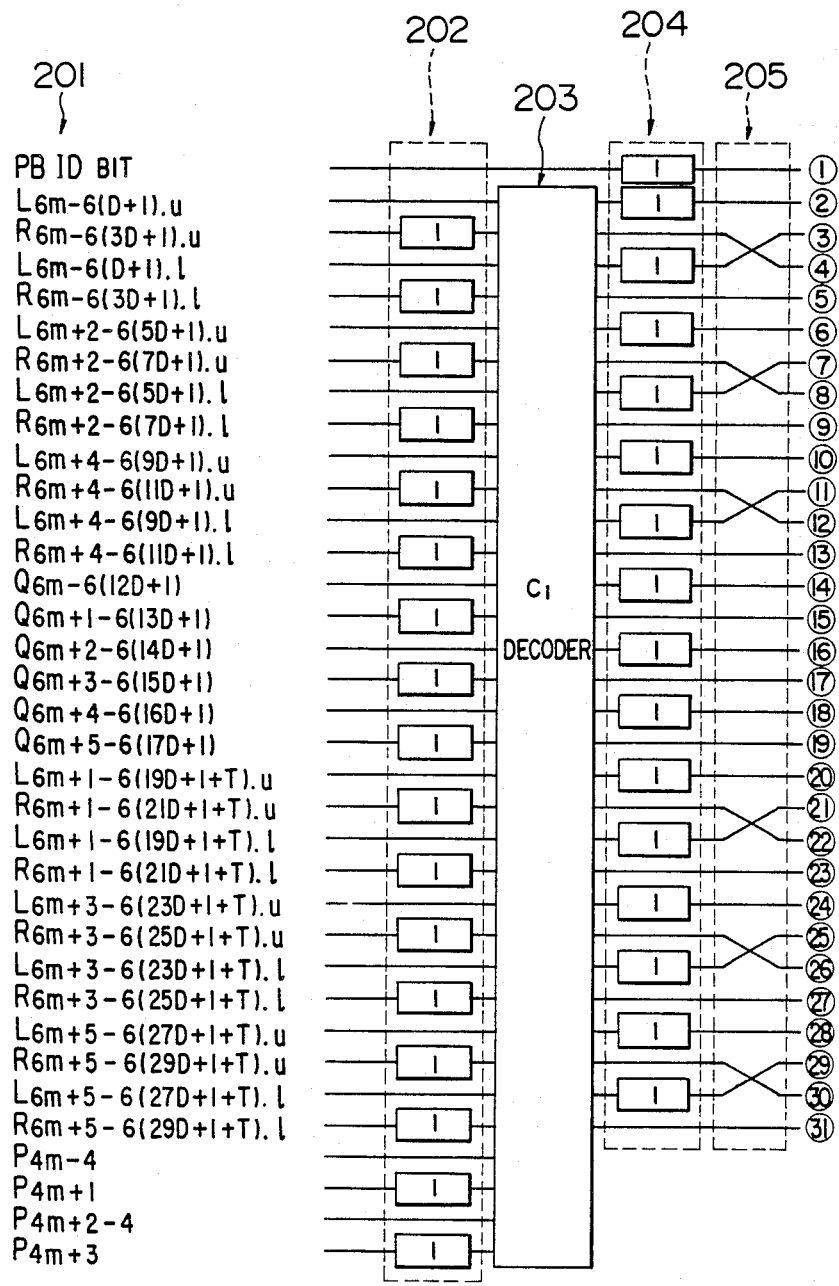
FIGS. 7A and 7B show a modification for performing the processes shown in FIGS. 6A and 6B in the reverse order at the de-interleave and ECC unit shown in FIG. 1.
Figure 7B:
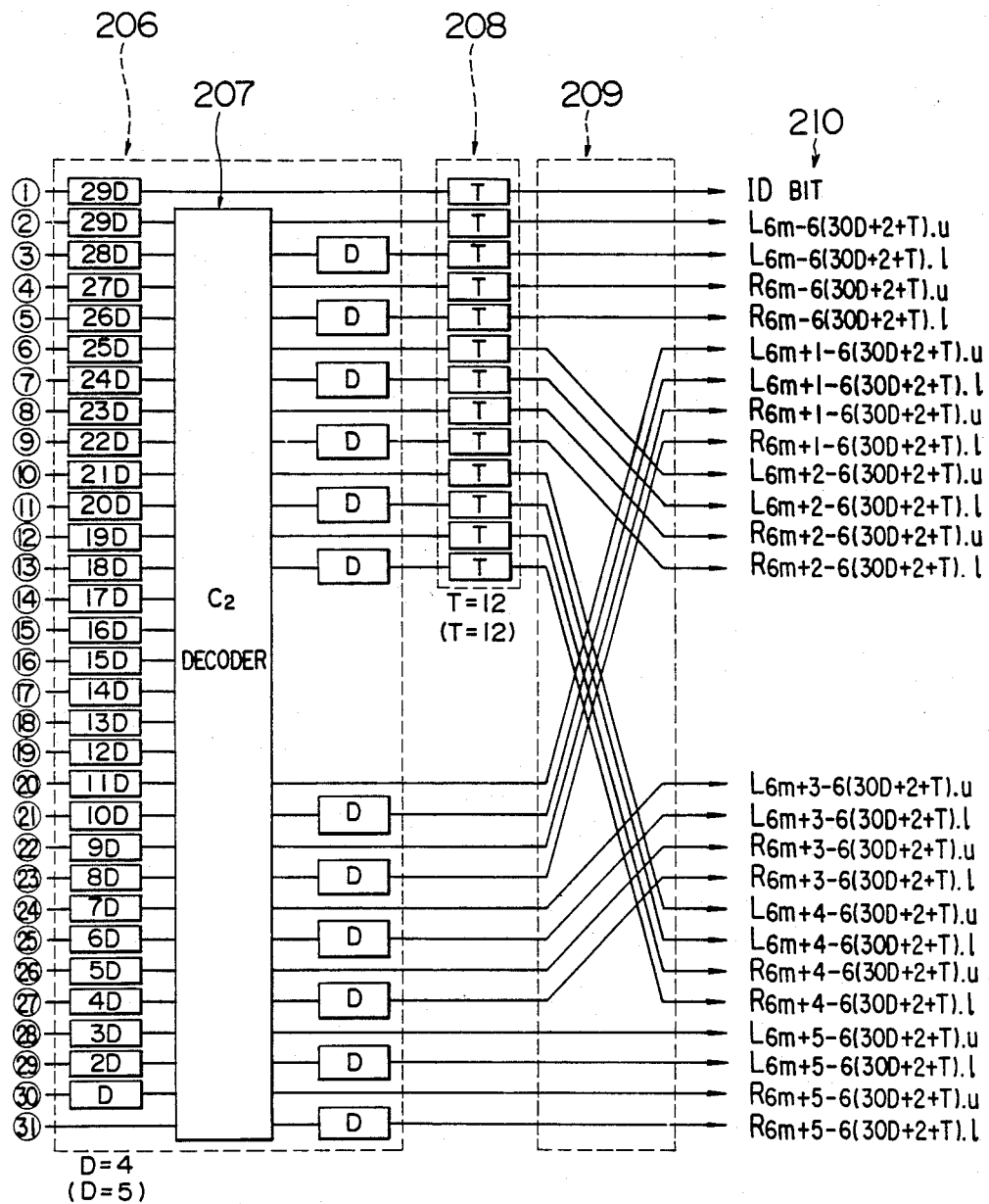

The object of the interleave method of the above embodiment is to record the upper and lower symbols on a magnetic tape in conjugate relation to each other and to make the first error correction code C2 series the same with respect to the upper and lower symbols of each sample data. The upper and lower symbols are not necessary by all means to have the same error correction code C2, but they may have otherwise the same error correction code C1. This modification is shown in FIGS. 6A and 6B wherein generating a first error correction code C2 at the C2 encode processing unit 34 is carried out at the middle of a main interleave processing unit 35 so that the first error correction code series displaces from the upper and lower symbol series. On the other hand, by subjecting to a second scramble process 36, the upper and lower symbol series have the same second error correction code C1. The positional arrangement of the upper and lower symbols on a magnetic tape is not in conjugate relation to each other, but it is in adjacent relation separated by one symbol. This modification can also have the same high error correction ability as the above embodiment. The detailed structure of the de-interleave and ECC unit of the modification is shown in FIGS. 7A and 7B.

I claim:
1. An interleave sequence method comprising:
a scramble step for dividing samples of an input signal digitalized at a predetermined sample frequency into time sequential and consecutive process units having an even number of samples, and separating the sample units into an even number sample unit series and an odd number sample unit series at a sequential sample order;
an offset delay process for delaying one of the even and odd number series;
a C2 encode process for generating a first error correction code C2 based on the data subjected to said offset delay process;
a main interleave process for delaying the data and first error correction code C2 subjected to said offset delay process such that a different linear delay time is given to each sample data;
a C1 interleave process for dividing respective sample data subjected to said main interleave process into upper symbols and lower symbols, and delaying only ones of the upper and lower symbols by a unit time;
a C1 encode process for generating a second error correction code C1 based on the data subjected to said C1 interleave process; and
a C1 de-interleave process for delaying only the other, opposite to those ones at said C1 interleave process, of the upper and lower symbols of the data and second error correction code C1 subjected to said C1 interleave process by the same unit time, to thereby form a one-block of a recording signal.

2. An interleave sequence method according to claim 1, wherein said input signal is an audio signal.

3. An interleave sequence method according to claim 2, wherein said audio signal is composed of a plurality of channel signals.

4. An interleave sequence method according to claim 2, wherein said audio signal is multiple-recorded with a video signal.

5. An interleave sequence method according to claim 1, wherein said different linear delay for each sample data in said main interleave process is divided into a predetermined delay for each upper symbol at a preceding time and a different linear delay for each symbol at a succeeding time, said C2 encode process is performed after said predetermined delay for each upper symbol, and after said main interleave process a second scramble process is performed whereat the L channel lower symbol and the R channel upper symbol at the same time sequence are interchanged.

6. An interleave sequence method according to claim 1 comprising the steps of: dividing time sequential and consecutive samples of each channel into process units having an even number of samples, prior to performing said scramble process; further dividing a plurality of said process units at a larger video field period to obtain two different fields one having samples per field larger than an average sample number and the other having samples per field smaller than said average sample number, making the sample numbers of said one and the other fields equal by performing selective recording of both said fields at the revolution period of a rotary head cylinder, and synchronizing both a video signal and an audio signal.

7. An interleave sequence method comprising: during decoding,
- a C1 interleave process for detecting a synchronous signal at each predetermined block and delaying, among those symbols with an established synchro standard, only one of an even number symbol series and an odd number symbol series as counted from said synchro standard by a predetermined amount of delay equal to that during encoding;
- a C1 decode process for performing error detection and correction of the data subjected to said C1 interleave process using a second error correction code C1;
- a C1 de-interleave process for delaying, among the data subjected to said C1 decode process to remove said second error correction code C1, only the other, opposite to said one at said C1 interleave process, of said even number symbol series and said odd number symbol series by the same amount of delay equal to that at said C1 interleave process;
- a main de-interleave process for giving a linear delay opposite to that during encoding;
- a C2 decode process for performing error detection and correction of the data subjected to said main interleave process using a first error correction code C2;
- an offset delay process for giving, after said C2 decode process, a predetermined delay to the data series different from that during encoding among the data series before and after said first error correction code C2; and
- a scramble process for interchangeably rearranging said both data series subjected to said offset delay process at a sequential sample order, to thereby obtain an original digital signal.

8. An interleave sequence method according to claim 7, wherein an input signal is an audio signal.

9. An interleave sequence method according to claim 8, wherein said audio signal is multiple-recorded with a video signal.

10. An interleave sequence method according to claim 9, wherein said audio signal is composed of a plurality of channel signals.

* * * * *